US006189785B1

United States Patent
Lowery

(10) Patent No.: US 6,189,785 B1
(45) Date of Patent: Feb. 20, 2001

(54) DEMAND DEPOSIT ACCOUNT DATA PROCESSING SYSTEM

(75) Inventor: Michael P. Lowery, Vernon, NJ (US)

(73) Assignee: International Check Services, Riverdale, NJ (US)

(*) Notice: Under 35 U.S.C. 154(b), the term of this patent shall be extended for 0 days.

(21) Appl. No.: 09/059,773

(22) Filed: Apr. 14, 1998

(51) Int. Cl.[7] .................................................. G06F 17/60
(52) U.S. Cl. .......................... 235/379; 235/380; 705/42; 705/45
(58) Field of Search ................................. 235/379, 380, 235/385, 437, 470; 705/42, 45

(56) References Cited

U.S. PATENT DOCUMENTS

| | | | |
|---|---|---|---|
| 4,264,808 | * 4/1981 | Owens et al. | 235/379 |
| 4,270,042 | * 5/1981 | Case | 235/379 |
| 4,321,672 | 3/1982 | Braun et al. | 364/408 |
| 4,804,825 | * 2/1989 | Bitoh | 235/380 |
| 4,823,264 | * 4/1989 | Deming | 235/379 |
| 5,237,159 | 8/1993 | Stephens et al. | 235/379 |
| 5,265,007 | * 11/1993 | Barnhard, Jr. et al. | 235/379 |
| 5,373,550 | * 12/1994 | Campbell et al. | 235/379 |
| 5,412,190 | 5/1995 | Josephson et al. | 235/379 |
| 5,484,988 | 1/1996 | Hills et al. | 235/379 |
| 5,532,464 | 7/1996 | Josephson et al. | 235/379 |
| 5,783,808 | * 7/1998 | Josephson | 235/379 |

* cited by examiner

Primary Examiner—Thien M. Le
Assistant Examiner—Daniel St. Cyr
(74) Attorney, Agent, or Firm—Woodard, Emhardt, Naughton Moriarty & McNett

(57) ABSTRACT

A demand deposit account data processing system is provided that allows merchants to settle transactions on line and in real time and that automatically processes transactions in a number of exception conditions. The system comprises demand deposit account data that originate from a data source, at least one point of sale terminal adapted to receive that data to initiate a transaction, a central computer system, first communication means integrated with the point of sale terminal for communicating with the central computer system, data storage means integrated with the point of sale terminal for storing the data, and second communication means integrated with the central computer system for receiving the data from the point of sale terminal and communicating with the data source. This configuration permits the central computer system to communicate with the data source to settle the transaction on line or through traditional automated clearing house channels. The system of the present invention preferably incorporates a number of authorization databases that can be used to verify a transaction even if it cannot be settled on line. The system also preferably automatically updates all of its databases with pertinent transaction information once a transaction result is obtained. Preferred embodiments of the present invention comprise a software program adapted to recognize and repair errors in the demand deposit account data before submission to the data source. Similarly, the present invention contemplates use of a software program adapted to submit demand deposit account data to a data source multiple times until the transaction is settled electronically. In this way, the cumbersome physical processing, temporal risk, and lack of flexibility to handle procedural variations at the point of sale associated with traditional check presentment systems can be avoided or eliminated.

33 Claims, 5 Drawing Sheets

DEMAND DEPOSIT ACCOUNT DATA PROCESSING SYSTEM

BACKGROUND OF THE INVENTION

1. Field of the Invention

The present invention relates generally to point of sale systems and more particularly to a demand deposit account data processing system whereby demand deposit account data may be recorded and processed in order to verify and settle transactions electronically.

2. Description of the Prior Art

The technology and hardware to accomplish electronic transfers of funds have been known in the art for some time. For instance, merchants presently have at their disposal devices such as checkreaders, terminals for magnetic cards such as credit cards and automated teller machine (ATM) debit cards, manual input of account information, or some combination thereof in order to obtain authorization for and settlement of transactions at the point of sale.

A typical prior art electronic funds transfer system 10 is shown in FIGS. 1a and 1b. The prior art system 10 comprises a point of sale terminal 22 that includes a printer, a display monitor, and a magnetic card and/or a checkreader. The point of sale terminal 22 also has associated therewith a microfilm camera 23 that photographs a completed check 20 presented by a purchaser. When a roll of microfilm is complete, the merchant delivers 24 the film cassette to the merchant's financial institution. The point of sale terminal 22 is connected to a central processing/communication system 25 by a direct line or by dial-up communications, and this central system 25 is adapted to review information received from the point of sale terminal 22 in order to determine whether a transaction should be authorized or denied 28 and to record and log 40 all information relating to the transaction for later retrieval and analysis.

In practice, a check 20 or bank card 21 is presented by a customer to a merchant and swiped through the checkreader or magnetic card reader, respectively. The checkreader portion of the point of sale terminal 22 reads by either magnetic ink character recognition (MICR) or optical character recognition (OCR) the American Banking Association (ABA) account indications printed on the face of the check 20 and converts this information to digital signals. The customer is prompted to key in the personal identification number (PIN) associated with his or her account, and the merchant then enters the sale data that indicates the amount of the transaction to be authorized. All this information is converted to digital signals and communicated to the central system 25 to begin the authorization process 28.

These digital signals, referred to hereinafter as "the transaction," enter the authorization process 28 and the central system 25 verifies the transaction by authorization algorithms, an ABA account number-PIN pair database 29, and a funds verification check 30. The ABA account number-PIN pair database 29 maintains a file of ABA account numbers and the PINs assigned to those numbers. The funds verification check 30 is a software program adapted to communicate with a paying financial institution 50A in order to determine that sufficient funds exist to cover the transaction.

The central system 25 then logs the MICR information 40, creates a transaction identification number 40, and, if the PIN is found to match 29 the account number and sufficient funds are determined to exist 30, an approval number is assigned 40. The central system 25 then creates 41 the electronic debit and credit files for submission to an automated clearing house (ACH) or federal reserve network computer. These electronic files 41 instruct the customer's bank, the paying financial institution 50A, to deposit the necessary funds in the merchant's bank, the depositing financial institution 50B. The ACH or federal reserve computers execute 42 these debit and credit file instructions., and the paying financial institution 50A deposits the customer's funds into the depositing financial institution 50B. Upon receipt by the point of sale terminal 22 of an approval message for a transaction, the merchant may issue an instruction to void 26 the transaction or to reverse 27 the previous transaction instruction, whether that previous instruction was to credit the merchant's account or to credit the customer's account.

All transaction information relating to approved transactions is recorded in the central system's data warehouse 51 for the merchant's future reference. These prior art systems 10 generally update their information on a daily basis in a batch process, and daily reports 52 may be generated to provide both detailed and summary records of transaction information.

While these prior art electronic funds transfer systems 10 represent a great advance over traditional check handling procedures that require transfer of a paper check among numerous financial institutions, they nonetheless suffer from a number of disadvantages. For example, these prior art systems 10 do not include or contemplate any mechanism for dealing with exception conditions such as an invalid PIN number or a denial due to insufficient funds. If exception conditions arise, prior art systems 10 simply decline to authorize the transaction and customers are left to find another form of payment or to abandon the transaction. As well, if the point of sale terminal 22 is not operating properly or not operating at all, merchants have no option but to submit the customer's check 20 into the traditional paper check processing stream for deposit at the merchant's financial institution 50B, thereby submitting themselves to the risks associated with this old payment method.

Most old systems rely upon the automated clearing house network to accomplish the actual crediting and debiting of funds. Regarding recording customer information to deal with exception conditions, the best method that prior art systems offer is a microfiche recording of the transaction. There is no means by which to accomplish real time posting of the point of sale debit transaction, nor do the old processing systems incorporate any method by which a transaction can be guaranteed in the absence of a successful communication with the customer's financial institution. A further significant disadvantage of these prior art systems concerns the inability of these systems to recognize and deal with exception conditions in real time so that a merchant can obtain all necessary information from the customer before the customer leaves the point of sale.

Examples of relevant prior art devices include U.S. Pat. No. 4,321,762 issued Mar. 23, 1982; U.S. Pat. No. 5,237,159 issued Aug. 17, 1993; U.S. Pat. No. 5,412,190 issued May 2, 1995; U.S. Pat. No. 5,484,988 issued Jan. 16, 1996; and U.S. Pat. No. 5,532,464 issued Jul. 2, 1996; and reference patents listed therein. However, this prior art leaves significant room for improvement, both in terms of the ability to settle transactions on line and in terms of the ability to deal with exception conditions. The present invention is addressed to such improvement.

SUMMARY OF THE INVENTION

Briefly describing one aspect of the present invention, there is provided a demand deposit account data processing system which facilitates on line settlement of point of sale funds transfer transactions. The present invention incorporates new technology and processing architecture to automate not only the initial capture of payment and payor information, the transaction authorization process, and the settlement of transactions at a point of sale terminal, but also the entire process for dealing with transaction exceptions such as redeposited items, corrected items, returned items, their collection, and the significant data management required for merchant risk reduction, legal compliance, and efficient customer service.

In one form of the invention, a demand deposit account data processing system is provided which comprises demand deposit account data having a data source, said data source being one selected from the group consisting of at least one network bank database and at least one non-network bank database; at least one point of sale terminal adapted to receive said demand deposit account data to initiate a transaction; a central computer system; and first communication means integrated with at least one point of sale terminal for electronically communicating with the central computer system. The at least one point of sale terminal includes data storage means integral therewith that stores the demand deposit account data. This particular form of the invention also comprises second communication means integrated with said central computer system for receiving said demand deposit account data from a plurality of said point of sale terminals and communicating with said data source. In this way, then, the central computer system identifies the data source and, in the case of demand deposit account data originating from the at least one network bank database, communicates with the at least one network bank database to settle the transaction electronically. In the case of demand deposit account data originating from the at least one non-network bank database, the central computer system communicates with the at least one non-network bank database to settle the transaction electronically.

This form of the invention may alternately include a plurality of databases including a financial institution conversion table database, a positive database, a negative database, a velocity/risk database, a closed account database, and an exception database. The availability of these databases to the authorization process reduces the temporal risk associated with traditional check or ACH processing if on line processing is not available for a particular transaction.

Additionally, the central computer system of this form of the invention may include database software adapted to detect and repair errors in the demand deposit account data before the data is submitted to the data source. If an error is not detected until after the data source has rejected the demand deposit account data, the present invention is adapted to repair the error and recommunicate the repaired demand deposit account data to the data source one or multiple times. This software program may be further adapted to communicate the demand deposit account data and sale data relevant to a transaction to the data source one or multiple times until that transaction is settled electronically. These features of the present invention reduce the risks that a simple computer error could cause denial of a transaction or that a delay in debiting funds from the payor's financial institution caused by that institution could result in a transaction being returned for insufficient or uncollected funds.

In a demand deposit account settlement process according to the present invention, there is provided demand deposit account data having a data source, said data source being selected from the group consisting of at least one network bank database and at least one non-network bank database; sale data; a central computer system having first communication means for communicating with the data source; and at least one point of sale terminal adapted to receive the demand deposit account data and the sale data and comprising data storage means for recording the demand deposit account data, a printer, and second communications means for communicating with the first communication means. A transaction according to this process is initiated by capturing the demand deposit account data and the sale data with the at least one point of sale terminal. The demand deposit account data is then stored in the data storage means, and both the demand deposit account data and the sale data are communicated to the central computer system which identifies the data source for the demand deposit account data. Thereafter, the demand deposit account data and sale data are communicated to the identified data source where the sale data and demand deposit account data are correlated with the data source to obtain a transaction result. This transaction result is then communicated to the central computer system and back to the at least one point of sale terminal.

The present process may also comprise the steps of debiting a demand deposit account identified by the demand deposit account data if that demand deposit account has said at least one network bank database as its data source; and transferring funds through said at least one non-network bank database if the demand deposit account has the at least one non-network bank database as its data source. This feature permits certain transactions to be memo posted and settled electronically on line and in real time, as opposed to the delayed settlement accomplished through non-network sources such as an automated clearing house.

In yet another embodiment of this process, a merchant who obtains a negative transaction result for a particular transaction may override the transaction result and accept the payor's check, which transaction is then settled through a non-network source. This gives the merchant the flexibility to decide whether or not it will assume the risk of a potentially uncollectible transaction.

Another preferred process includes the step of automatically updating said plurality of databases with information from the transaction result. As well, certain preferred processes according the present invention comprise the steps of repairing and recommunicating the demand deposit account data and sale data to the data source one or more times for correlation if an erroneous demand deposit account data transaction result is communicated. The demand deposit account data and sale data may also be recommunicated one or more times to the data source for correlation if an insufficient or uncollected funds transaction result is communicated.

Further objects and advantages of the present invention will be apparent from the following description.

DESCRIPTION OF THE PREFERRED EMBODIMENTS

Figure 1A:
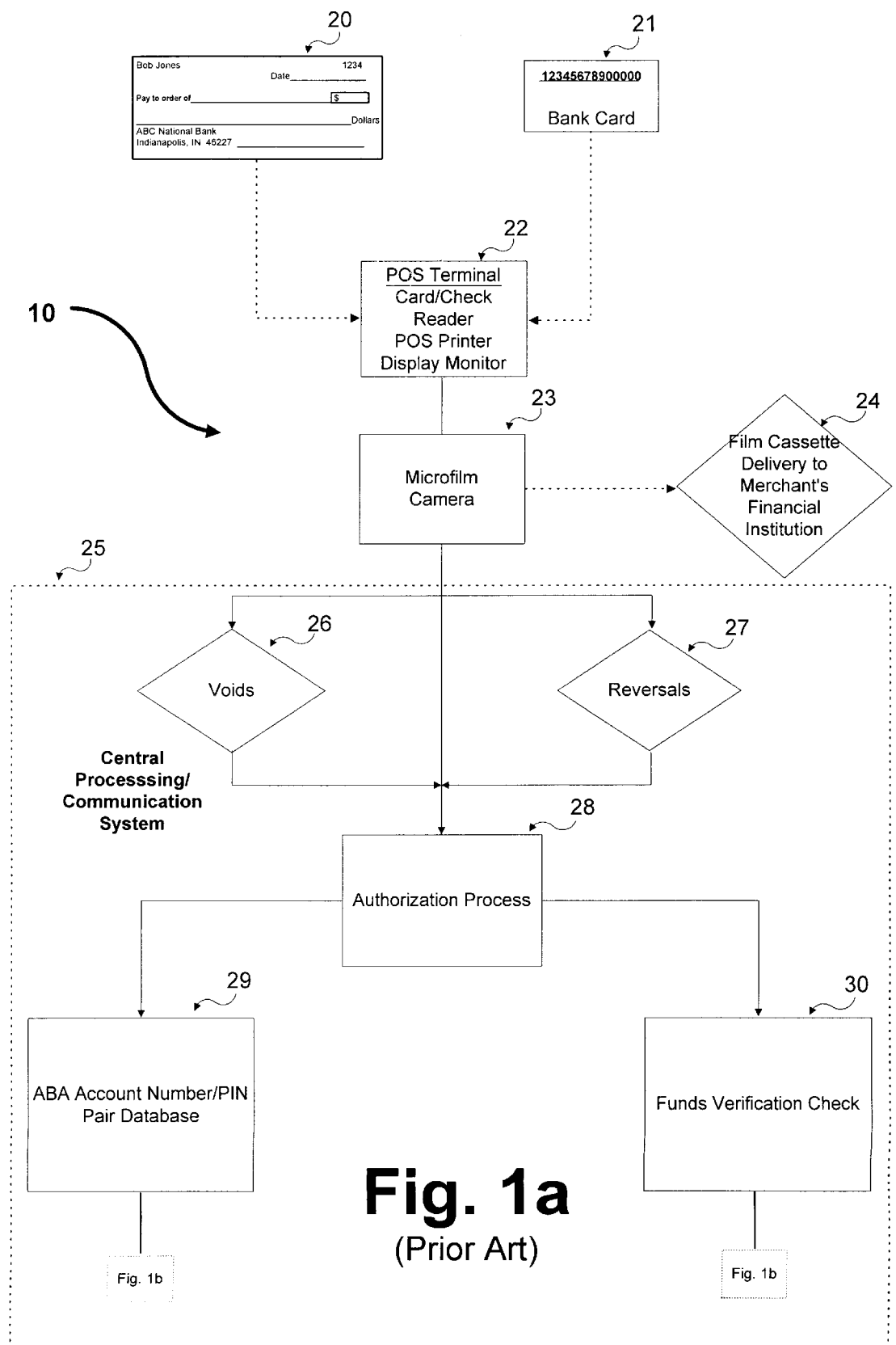
FIG. 1a is a block diagram of a prior art electronic funds transfer system describing the point of sale and authorization processes.
Figure 1B:
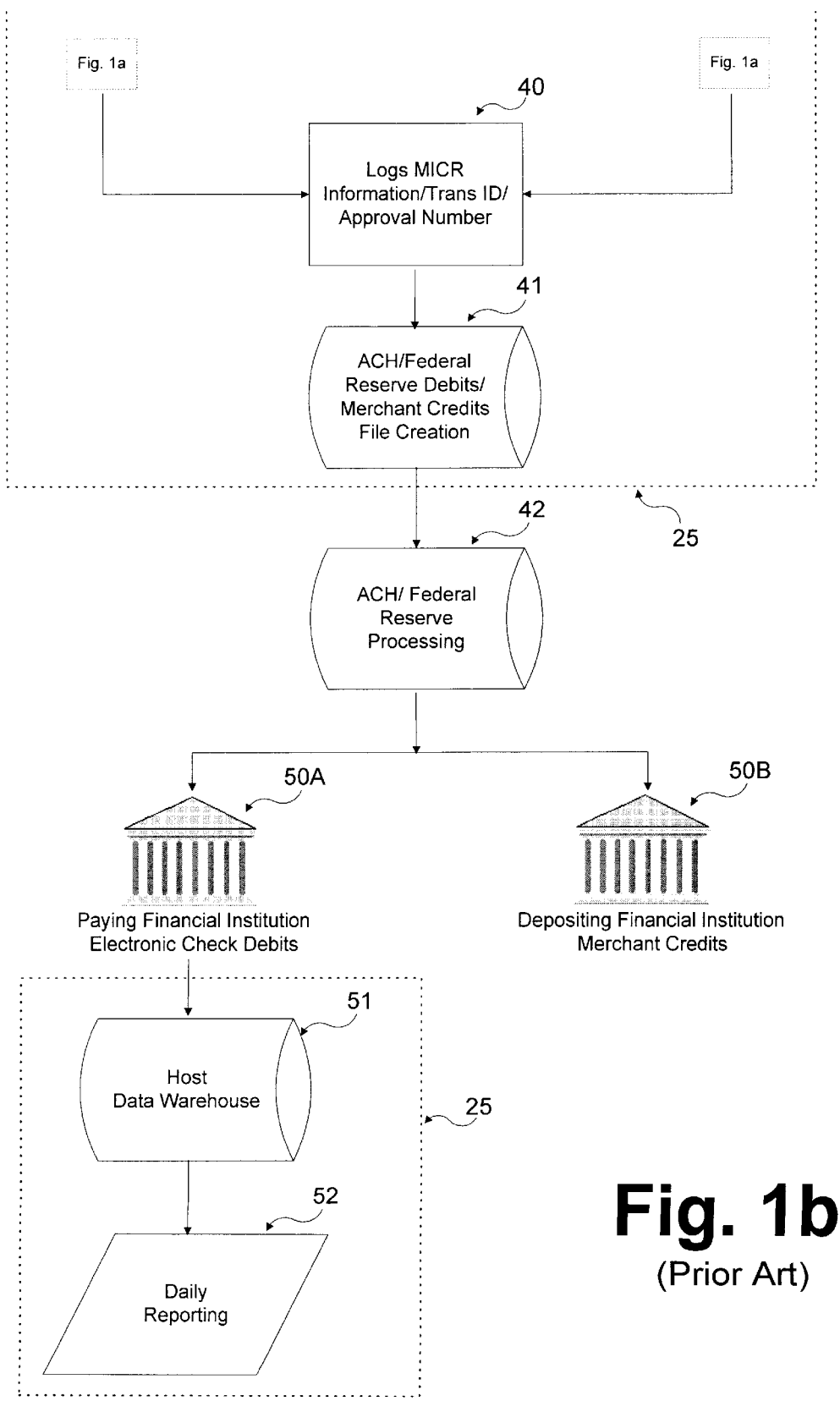
FIG. 1b is a block diagram of the prior art electronic funds transfer system of FIG. 1a describing the data conversion process, the ACH payment process, host database updating, and report generation.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and process, and such further applications of the principles of the invention as illustrated therein being contemplated as would normally occur to one skilled in the art to which the invention relates.

Figure 2A:
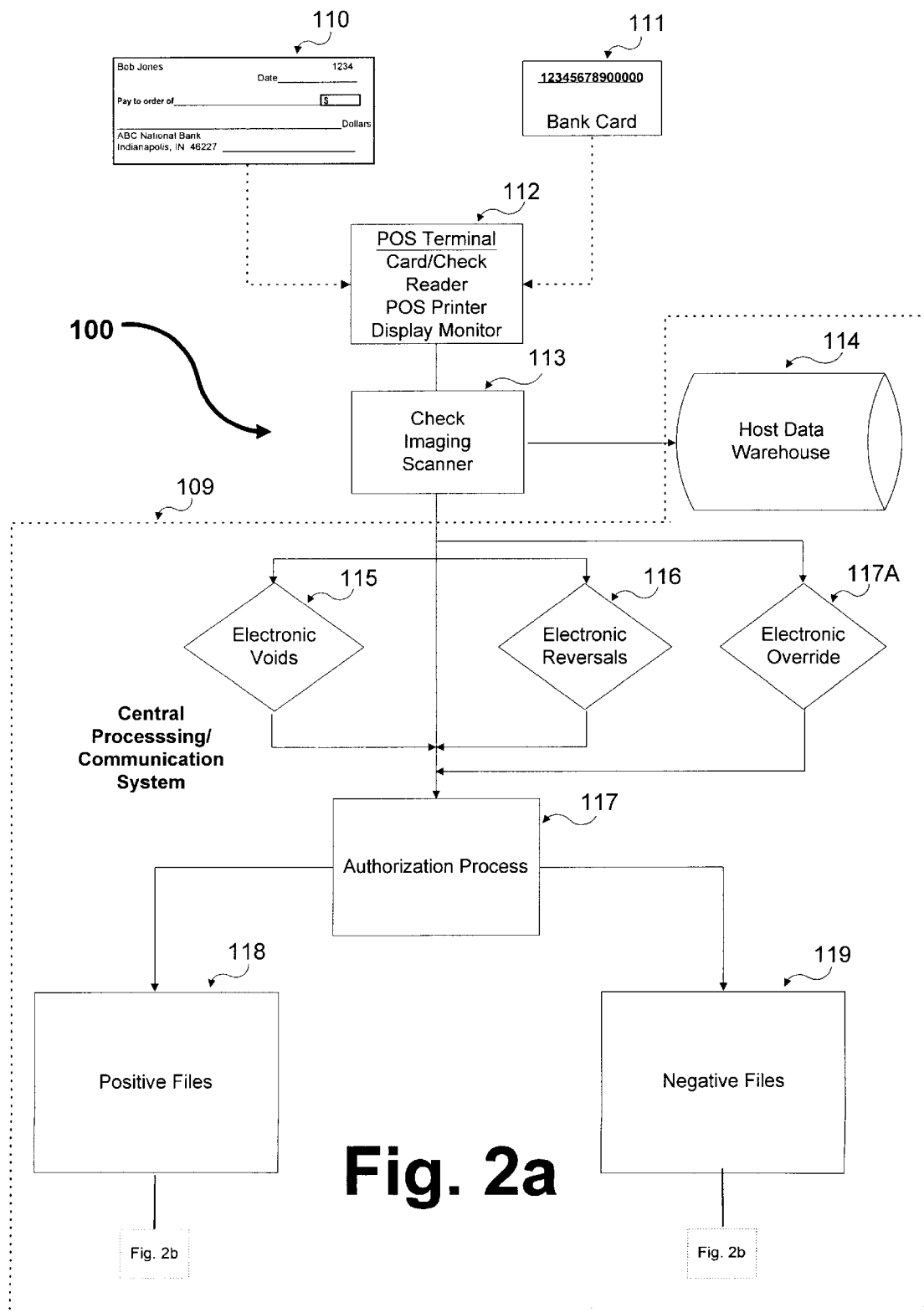
FIG. 2a is a block diagram of a demand deposit account data processing system constructed in accordance with the present invention and particularly illustrating the point of sale and authorization processes.
Figure 2B:
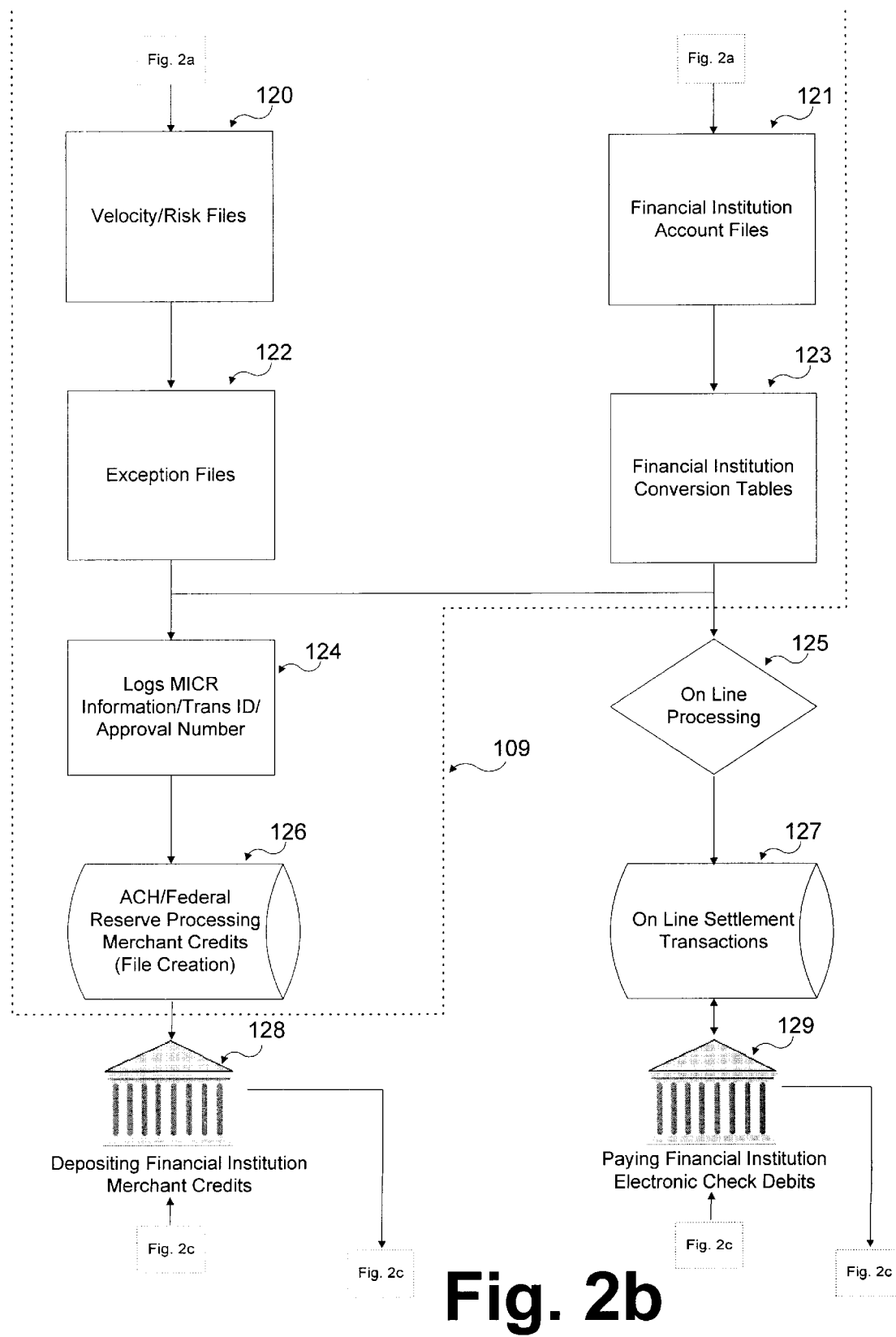
FIG. 2b is a block diagram of the demand deposit account data processing system of FIG. 2a and particularly illustrating the data conversion and on line and ACH payment processes.
Figure 2C:
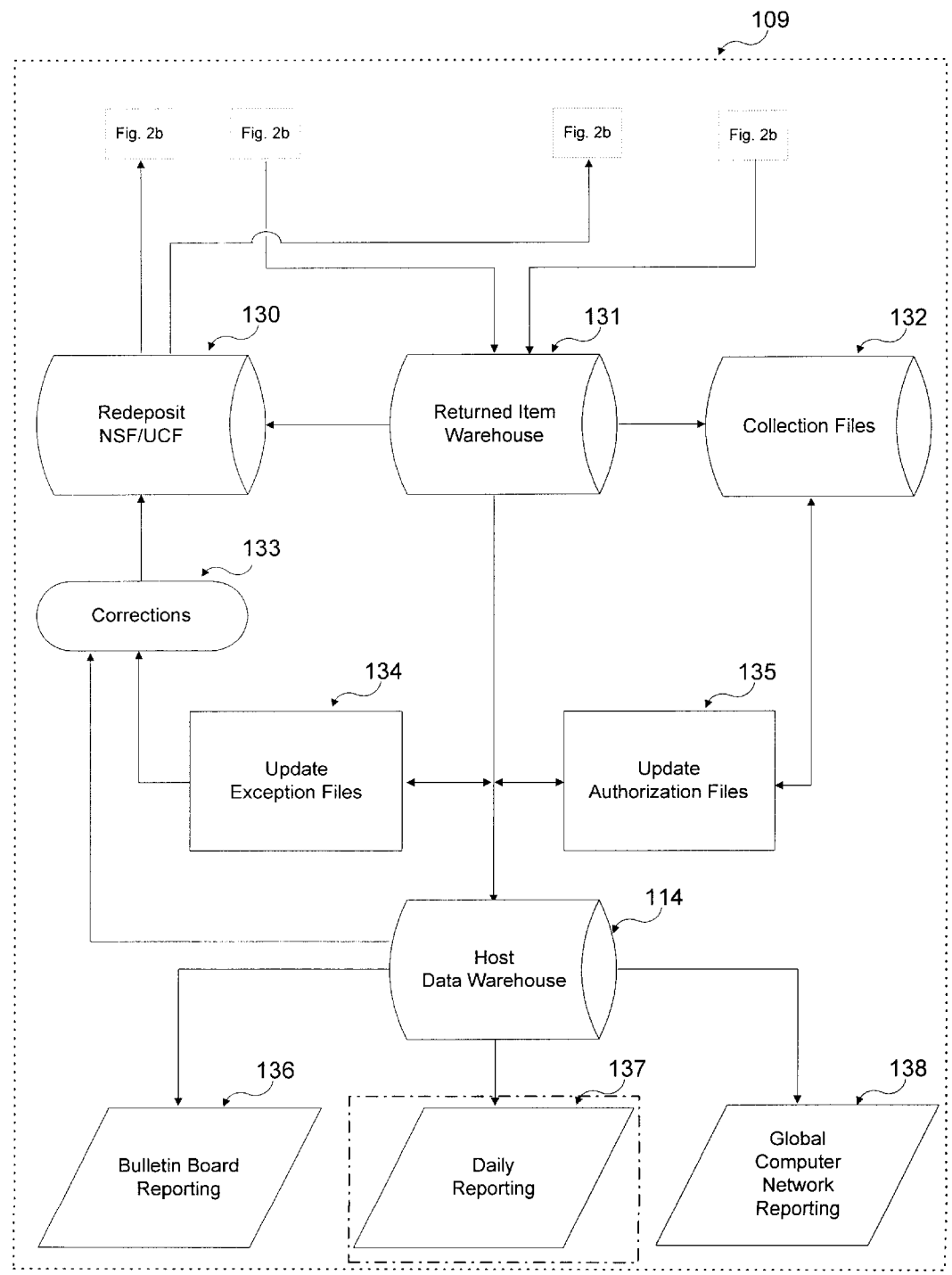
FIG. 2c is a block diagram of the demand deposit account data processing system of FIG. 2a and particularly illustrating the exception processing, database updating, and report generation features.

The present invention provides a demand deposit account data processing system that gives merchants extensive control over their payment operations at the point of sale and allows check transactions to be verified, memo posted, and settled on line. A most preferred embodiment of the present invention is illustrated in FIGS. 2a–c. In these figures, there is illustrated in flow chart form the hardware and process by which a specific point of sale terminal may cooperate with various financial institutions in order to process and verify financial data and thereby obtain a transaction result. The principal hardware involved is illustrated in general form and comprises a bank check 110, a point of sale terminal 112, a check imaging scanner 113, and a central processing/communication system 109 that comprises a central processing unit and associated computer peripherals adapted to carry out a number of programming and data storage functions, as well as to communicate with financial institution data sources 128, 129, in order to verify transaction data and authorize a transaction result. It will also be understood by those of ordinary skill in the art that all dotted flow lines represent manual functions and all solid lines represent automated electronic functions.

This most preferred embodiment comprises an integrated system that combines automated check information capture, automated payor information capture, and electronic check authorization processes with automated settlement options and back office exception item processing. This ability to settle items on line, especially when combined with a system capable of dealing with exception items, e.g., correcting and repairing errors in demand deposit account data by reference to the stored check image, represents a significant improvement over prior art check and ATM electronic debit processing systems.

The check 110 bears an ABA MICR encoded account number pre-printed on the face. Also pre-printed on the face of the check 110 are various image fields such as the payor's name and address, the sequence number of the check, the name and address of the financial institution that is the data source for the check 110, and various blank fields such as date, amount, and signature that are filled in manually by the payor in order to initiate a transaction.

The point of sale terminal 112 preferably contains at least a checkreader, also known as an ABA code reader, that is preferably of the type selected to read by either MICR or OCR the account indications on the check 110. The checkreader is actuated by a detector that responds to insertion of the check 110 into the point of sale terminal 112 and generates digital signals indicative of the ABA MICR or OCR encoded account number preprinted on the check 110. Although not specifically shown in the drawings, the checkreader and the detector are of any type known in the art for such applications.

The point of sale terminal 112 also preferably includes a check imaging scanner 113, a point of sale printer (not shown), and a display monitor (not shown). The point of sale printer may be any type of computer printer capable of generating an authorization receipt recording the identification of the merchant, the check 110 information, sale information, and the transaction result. The information actually printed by the point of sale printer, however, may be of any type and is customizable, depending upon a merchant's needs.

As well, the display monitor may be any type of computer monitor capable of displaying message prompts that ask an operator to input customer information and sale information. The display monitor may be integrated with the point of sale terminal 112, but it is also contemplated and intended by the present invention that the display monitor may be part of an electronic cash register that communicates with the point of sale terminal 112.

The check imaging scanner 113 is adapted to capture and convert to digital signals for transmission to the central processing/communication system 109 and, more specifically, to a host data warehouse 114, at least the preprinted name and address information and the MICR account characters on the check 110. However, any portion of the check 110 may be imaged for storage in the host data warehouse 114 for later retrieval. The most preferred embodiment of the present invention contemplates imaging the name and address along with the MICR information using the check imaging scanner 113 because these are the information fields most beneficial for correction and repair of an electronic transaction that is rejected for invalid account information or when the account cannot be located at all.

The provision of this check imaging scanner 113 and the transmission of data captured by the scanner 113 to the host data warehouse 114 overcomes significant disadvantages of prior art check imaging systems that use camera and film-based information storage. These prior art systems photograph the check at the point of sale, and the film must then be transported manually to the merchant's financial institution. The present invention eliminates this delivery step and makes the scanned information available to anyone with computer access to the host data warehouse 114.

In the most preferred embodiment of the present invention, the point of sale terminal 112 incorporates a software program adapted to prompt for, transmit on line, and record customer information. This software program is customizable for particular applications and can be integrated with existing merchant check authorization processes as well as with credit and debit terminal software. For merchants working in a customized point of sale environment using electronic cash registers, local area network/wide area network configurations, or some combination thereof, various customized software program specifications may be provided to the merchant for integration.

In another preferred embodiment of the present invention, the point of sale terminal 112 also comprises a keyboard (not shown). The provision of a keyboard in this preferred embodiment gives a merchant additional flexibility to customize the message prompts from the point of sale terminal to the merchant's business. The software program included in the point of sale terminal 112 can prompt for information such as driver's license and state code, phone number, frequent shopper numbers, and even name and address, which information can be entered by an operator using this keyboard option.

Additionally, the most preferred embodiment of the present invention incorporates keys or other prompts adapted to automatically void or credit prior transactions on line, with the system 100 determining whether to delete or reverse items, as required. For customers deciding to return merchandise, or in the case of an error by a merchant, the point of sale terminal 112 can electronically delete 115 the transaction from the central system 109, or, if the transaction has been authorized by the central system 109 and delivered for off-line settlement, create 116 a reversing entry. In both cases, the software program prepares and delivers a corresponding receipt to the point of sale printer that indicates the appropriate void or credit information.

The software program is further preferably adapted to permit merchants to override 117A a negative transaction result received from the central system 109 and settle the transaction electronically. As well, the software program is preferably adapted to process and record 114 transactions even when the transaction settlement does not occur on line, but rather occurs by the merchant taking conventional payment forms such as a tendered paper check. In such a situation, the check authorization obtained by the point of sale terminal 112 from the central system 109, will be logged 124 and transmitted to the host data warehouse 114 to provide an electronic record of the transaction.

The central system 109 most preferably includes database software adapted to automatically log and summarize all transaction information received from a plurality of point of sale terminals 112. This transaction information includes at least demand deposit account information and sale data. The database software is further adapted to create and assign 124 a unique transaction identification number to each transaction, an approval number if transaction authorization is obtained, as well as additional information such as transaction status and settlement cutoff time, all of which are then stored in the host data warehouse 114 with the transaction information under the unique identification number. The demand deposit account information preferably comprises the customer's name and address, the check sequence number, the MICR or OCR account number and the ABA routing number. As previously stated, however, additional information can be accommodated by the host data warehouse 114 if such information has been collected through a merchant-customized point of sale terminal 112.

The central system 109 in the most preferred embodiment has as one feature an authorization process 117 that combines authorization algorithms with a plurality of databases to verify account information and authorize point of sale transactions. The authorization algorithms contemplated by the present invention are those as would occur to one of ordinary skill in the art of credit risk assessment.

Preferably, this plurality of databases comprises at least a positive database 118, a negative database 119, a velocity/risk database 120, a closed account database 121, an exception database 122, and a financial institution conversion table database 123. Skilled artisans in the industry to which the instant invention pertains will understand that the foregoing database designations have certain meanings in the industry. The following descriptions of these designations are provided for convenience only and are not intended to limit these understood meanings in any way.

The positive database 118 as herein contemplated contains information regarding check writers who have had checks authorized or processed in a payments processing stream and the checks have cleared successfully. The negative database 119, conversely, contains data specific to check writers who have had items returned for insufficient or uncollected funds or for any other reason. The velocity/risk database 120 is particularly adapted to detect possible fraudulent or high-risk activity at the point of sale by employing a variety of counters and algorithms to detect multiple occurrences, high dollar amounts, and other demographics. As well, the closed account database 121 preferably contains information regarding closed accounts and other high-risk accounts, and the exception database 122 maintains files of MICR anomalies in order to analyze and possibly reformat incoming MICR information to enable the authorization algorithms to query successfully all the databases and format a payment instruction.

The financial institution conversion table database 123 is adapted to map client account information, such as MICR or OCR information, to its data source. That is, this conversion table database 123 is populated with bank tables and maintained so that the database 123 can be accessed by the central system 109 and the client account information converted to a demand deposit account number, an ACH compatible number, and/or a PAN/BIN number. Once so converted, the central system 109 can communicate 125, 126 with the financial institution data source 128, 129 identified by the converted client account information in order to obtain on line authorization 127 or batch authorization 126, and thereby settle the transaction.

The on line processing feature 125 of the present system 100 is used for all transactions drawn on paying financial institutions 129 having on line connections to the central system 109. Customer debits from these network banks are preferably authorized on the central system 109 initially using the authorization process 117 and then switched on line 125 to the paying financial institution 129 for immediate on line settlement of the transaction 127. Merchant credits for sales preferably use the ACH process 126 for settlement, but they may also use the faster method of wire transfer, depending upon the volume of credit transactions.

In both the ACH or batch processing 126 and on line processing 125 situations, the settlement is logged to the central system 109 in real time, rather than at the end of the day as in prior art batch processes such as are used by credit and off-line debit card programs. The point of sale terminals 112, however, may emulate the batch process at the end of the business day and produce end of day reporting in both a detailed format and a summary format for sales reconciliation.

Even if on line settlement cannot be accomplished, merchants can use this authorization process 117 to guarantee transactions for which they have agreed to accept the payor's tender of a paper check. The inability to accomplish electronic settlement, whether on line or ACH-type settlement, is an example of an exception condition that the present invention is designed to recognize and electronically remedy on behalf of the merchant. The processes by which the instant invention addresses various exception conditions are discussed in detail below. Prior art systems have neither addressed, nor contemplated, automated solutions to exception conditions.

The database software contained in the most preferred embodiment of the instant invention is also adapted to recognize and repair any errors that may be found in the demand deposit account data. As stated previously, this recognition and repair function uses the exception database 122 when the transaction information first proceeds through the authorization process 117. If the exception database 122 recognizes the demand deposit account data as being erroneous, then it is adapted to reformat the demand deposit account data in order to successfully query the other databases.

If the demand deposit account data is either not reformatted or is reformatted incorrectly, is submitted to the respective financial institution data source 128, 129, and is returned 131 for an invalid account number or a not-located account, then another exception condition arises. The database software in this case obtains the stored check image from the host data warehouse 114, uses this image to correct 133 the demand deposit account data, and thereafter resubmits 130 that corrected demand deposit account data to at least one of the financial institution data sources 128, 129 for settlement.

An additional exception condition arises when a transaction item is returned 131 for non-sufficient (NSF) or uncollected (UCF) funds. Faced with this exception condition, the most preferred database software program is adapted to resubmit the transaction information one or multiple times 130 to at least one of the financial institution data sources 128, 129 until the transaction can be settled electronically.

Certain exception conditions relate to unusual account activity identified by the velocity/risk database 120 and to periodic manual checks designed to ensure the system is working properly. Under these conditions, a specific referral code may be delivered from the central system 109 to the point of sale terminal 112. A merchant receiving a referral code must contact an authorizer at the central processing/communication system 109 and provide the referral code to the authorizer. The authorizer then enters the code to retrieve the check image and/or check sale information from the host data warehouse 114 and, assuming that such information has not already been entered on line, prompts the merchant to enter the payor's identification information, such as name, address, and phone number, into the point of sale terminal 112. If authorized by the authorization process 117, the authorizer will provide a unique transaction identification number and an approval number for the merchant to enter into the point of sale terminal 112 as prompted.

Additionally, it is presently contemplated that occasional disruptions in point of sale terminal 112 function will occur, thereby creating another exception condition. If the point of sale terminal 112 is broken or malfunctioning, a merchant will create a manually written receipt and will call an authorizer as outlined above. Upon receiving the unique transaction identification and approval numbers, the merchant enters these numbers on the written receipt. The payor then signs the receipt to authorize electronic settlement of his or her transaction at a later time.

These features of the most preferred database software program are substantial advancements over prior art check processing systems because they provide a merchant with unprecedented flexibility in a point of sale transaction and a customer with unprecedented efficiency of service. For example, the ability to recognize errors in demand deposit account data and refer to the image information obtained by the check imaging scanner 113 and stored in the host data warehouse 114 for correction and repair, gives a merchant the opportunity not only to request additional information from the payor at the point of sale, but also obviates the inconvenience experienced by customers who submit valid demand deposit account data that is subsequently garbled by, for instance, a malfunctioning checkreader.

If a transaction should be denied for any reason, whether for failure to clear the authorization process or for failure of the transaction to be settled by the paying financial institution, the central system 109 is adapted to deliver that item to a returned item database 131 where it is logged and retained for future reference. Unlike prior art systems in which a transaction is immediately declined upon failure of the item to be settled by the paying financial institution the first time the transaction is submitted, however, the central system 109 attempts to determine the reason why an item was returned and initiate a responsive action depending on the reason. This process, perhaps even more importantly, is documented through simultaneous updates of the relevant databases in an effort to prevent similar items from being returned in the future. Items returned due to misread characters or MICR exceptions not yet cataloged in the exception database 122, for instance, are repaired 133 and resubmitted 130 to the financial institution data source 128, 129 from which the return was received, while the exception database 122 is simultaneously updated 134. Similarly, should an item be returned again after being redeposited 130 multiple times, the returned item database 131 delivers the fatal return to a collection database 132, and the negative and/or closed account databases 119, 121 are updated 135 with the results from this transaction.

All transaction data is submitted to the host data warehouse 114 where it can be accessed by participating merchants via such options as HTML format and/or downloading reports or raw data from the central system's bulletin board system 136, daily fax or mail print reporting 137, and/or global computer network reporting 138. With reference to FIG. 2c, it will be understood by those of ordinary skill that the dashed and dotted lines surrounding the daily reporting 137 box indicate both manual and electronic processing. That is, the daily reporting 137 may occur by, for example, computer generated faxes or e-mail, but it may also occur by means of manually handled paper printouts faxed, mailed, or otherwise delivered to the merchant.

While prior art systems have incorporated some form of merchant reporting system for transaction results particular to that merchant, it has previously been impossible to obtain real time updates regarding account status and/or balances, or real time detail reports and summary reports for subjects as precise as each point of sale terminal up to subjects as broad as consolidated sales information from all point of sale terminals across the country. This feature provides merchants with an important and unprecedented level of access to their transaction information.

Merchants who use the present invention to process repeat customers also have the opportunity to use an alternate form of the invention employing a magnetic stripe bank card 111. In this alternate embodiment, a merchant provides a repeat customer with a form that asks for the repeat customer's personal and bank information as well as authorization to debit and adjust the customer's account electronically. The information contained on the form is preferably processed for approval using the customer's credit history available from various well-known credit reporting agencies in combination with the authorization process 117 of the present invention.

If authorized, the customer's information is logged in the host data warehouse 114, a unique customer number is assigned to the customer, and a bank card 111 bearing this unique customer number in its magnetic stripe is sent to the customer. Transactions are then initiated at the point of sale terminal 112 using a magnetic stripe reader (not shown) instead of a checkreader, and the check imaging scanner 113 is unnecessary. Otherwise, the remaining steps of the demand deposit account data processing system of the present invention occur as described above. This bank card 111 is more convenient for the customer than paper checks, and the merchant is assured not only of settlement of the customer's transaction but also of obtaining significant marketing and other demographic information useful to its business when the customer fills out the form to obtain the bank card 111.

Having now described the apparatus of the present invention in detail, the method by which this apparatus accomplishes verification, authorization, and settlement of a transaction is hereafter explained. At the point of sale terminal 112, the check 110 is presented and swiped through the checkreader and the optional check imaging scanner 113 to record an image of the check 110. In the case of a bank card 111, the magnetic stripe of the card is swiped through a card reader incorporated into the point of sale terminal 112. Message prompts are driven down to the display monitor incorporated into the point of sale terminal 112 from the central system 109 to prompt for capture of the sale data and payor identification information. Merchant-specific central system 109 processing tables generate additional message prompts that are unique to the merchant's business, such as authorization receipts specific to electronic funds transfer authorization requirements and state service fee disclosures. The point of sale terminal 112 is connected to the central system 109 either through a direct line or through dial-up communications. The payor's account information, whether MICR, OCR, or magnetic stripe encoded, and the check image and payor identification information are sent to the central system 109 for verification and storage, respectively. The sale data is sent to the central system 109 for authorization.

Immediately upon completing delivery of all the information prompted for by the point of sale terminal 112, a unique transaction identification number is assigned 124 to the data by the central system 109 for later retrieval should the item be returned. This unique transaction identification number is also used when storing the check image in the host data warehouse 114. The transaction, which comprises at least the payor's account information and the sale data, then enters the authorization process 117, and the item is verified via authorization algorithms and the plurality of databases 118, 119, 120, 121, 122, 123.

During the authorization process 117, the source of the payor's account information is identified. If this data source is a financial institution with which the central system 109 has direct on line access, then the transaction is processed on line 125; the transaction is either verified or memo posted and settled electronically 127, or both; and the payor's financial institution issues an electronic debit 129. On the other hand, if this data source is not linked directly to the central system 109, the central system 109 can verify the transaction, but if settlement of the transaction is requested, the central system 109 must create an authorized electronic debit file for submission to an ACH or federal reserve bank. In a preferred process of the instant invention, the merchant's account is credited through the ACH/federal reserve bank network for all transactions authorized by the authorization process 117, while the paying financial institution account is debited on line if such access is available.

Assuming no exception conditions arise in either settlement avenue, an authorization number is returned electronically to the point of sale terminal 112 and the printer incorporated therewith generates an authorization receipt that preferably records the merchant, check, and sale information. The check 110 is then voided or otherwise franked in front of the customer, and the customer signs the authorization receipt and is given a copy. The check 110 may then be either returned to the customer with the authorization receipt copy or may be kept by the merchant and filed with the original authorization receipt.

Exception conditions consist of occasions when a transaction cannot be authorized or settled after proceeding through the steps illustrated in FIGS. 2*a* and 2*b*. Exception conditions can arise for any number of reasons, including insufficient or uncollected funds, an invalid or not located account, or for triggering of warning signals within the velocity/risk database 120. While the prior industry solution to these exception conditions was to keep the original check used at the point of sale or to return the check after writing down the payor's name, address, phone number, and other identifying information, the present demand deposit account data processing system invention provides a number of options for the merchant to handle virtually any procedural variation at the point of sale.

In addition to the exception processing capabilities previously described, the instant invention provides merchants with several other options for handling atypical transactions. The authorization process 117 of the present system provides merchants with the ability to override negative verifications and and accept the payor's check if, for example, the central system 109 could not identify or locate the payor's account. A merchant may take various circumstances into account and decide to assume liability for a potentially bad check by forcing a settlement to take place and submitting the check for settlement through a non-network source. The present system also permits merchants to bypass the authorization process 117 if they want to accomplish an electronic funds transfer process and settlement and do not believe the authorization process 117 is necessary.

Further, the present system enables the point of sale terminal 112 to process real time when an approval message is received but conditions nonetheless require the check 110 to be settled in the traditional paper stream, i.e., tendered to the merchant and deposited with the depositing financial institution 128. In instances when a customer insists on tendering a check and the merchant is willing to accommodate the situation, the check authorization will be logged by the point of sale terminal 112 and transmitted to the host data warehouse 114 for storage but will not be settled electronically.

According to a preferred method of using the present invention, items returned are resolved electronically, thereby eliminating a significant amount of labor required to deal with returned items using prior art processing systems. Returned items automatically update 134, 135 relevant databases in an effort to eliminate subsequent errors in verifying the payor's account information, and returns are automatically redeposited 130 on behalf of the merchant. Most preferably, the system 100 will automatically redeposit these returned items up to two additional times while tracking the settlement position with the merchant. The redepositing step 130 may, theoretically, occur as many times as desired, but the current banking laws do not permit more than two redeposit attempts for a particular transaction because banking systems presently charge a service fee to the customer's account every time an item is returned for insufficient or uncollected funds.

In the case of merchants subscribing to collection services, or for check guarantee merchants, returned items are automatically routed to the collection system 132. Here the fatally returned items may be accessed by the merchant's collection service in order to initiate collection efforts, and access to the payor data contained in the host data warehouse 114 may also be permitted through this collection system 132.

Should customers decide to return merchandise, or in the case of an error by the merchant, the present invention provides the ability to electronically void and/or reverse on line a previously authorized transaction. In order to void the transaction, the point of sale terminal 112 is provided with a designated void key or display prompt. If the item has not been delivered to the ACH or on line bank network, voiding the item will delete it from the central system 109. On the other hand, if the item has already been settled with either financial institution data source 128, 129 then a credit for the amount will be issued to offset the original debit.

As discussed previously, the present invention is adapted for use with both on line processing 125 and ACH/federal reserve processing 126. The present system enjoys certain features with regard to this ACH/federal reserve processing step that further differentiate it from prior art processing systems. For instance, the present system is capable of differentiating settlement cut-off times across various time zones. The present system can also distinguish between the schedules and rates provided by various ACH operators and can submit the transaction item to the lowest priced ACH operator at the time of the transaction event. Obviously, these capabilities imbue the instant invention with greater efficiency and economy than has previously been attainable using prior art systems.

Those of ordinary skill in the art will recognize that the present invention automates the recognition and processing of a number of exception conditions, the settlement of transactions, and transaction accounting at the point of sale. Prior art funds transfer processing systems have not previously addressed these features. When demand deposit account data is processed and memo posted on line according to the present invention, settlement of the transaction is guaranteed to the merchant rather than the merchant having to assume the temporal risk associated with traditional checks or ACH processing. As well, transactions settled in accordance with the present invention vastly improve customer convenience when compared with prior art systems. Exception conditions can be handled and reprocessed in real time to avoid returned items due to computer errors, and the present invention learns from its mistakes to streamline the processing of a customer's account information in the future.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A demand deposit account data processing system comprising:

demand deposit account data having a data source, said data source being one selected from the group consisting of at least one network bank database and at least one non-network bank database; at least one point of sale terminal adapted to receive said demand deposit account data to initiate a transaction;

a central computer system;

first communication means integrated with said at least one point of sale terminal for electronically communicating with said central computer system;

data storage means integrated with said point of sale terminal for storing said demand deposit account data;

second communication means integrated with said central computer system for receiving said demand deposit account data from said at least one point of sale terminal and communicating with said network bank database and said non-network bank database; whereby said central computer system identifies said data source and, in the case of demand deposit account data for said at least one network bank database, communicates with said at least one network bank database to settle said transaction on line, and in the case of demand deposit account data for said at least one non-network bank database, communicates with said at least one non-network bank database to settle said transaction off line.

2. The demand deposit account data processing system of claim 1, wherein said at least one point of sale terminal further includes a scanner adapted to read magnetic ink character recognition numbers and field information appearing on a check for transmission to and storage in said data storage means.

3. The demand deposit account data processing system of claim 1, wherein said central computer system includes a plurality of databases, said plurality of databases including a financial institution conversion table database.

4. The demand deposit account data processing system of claim 3, wherein said plurality of databases further includes at least:

a positive database;

a negative database;

a velocity/risk database;

a closed account database; and an exception database.

5. The demand deposit account data processing system of claim 1, wherein said at least one point of sale terminal further includes a software program, said software program being adapted to prompt for, transmit on line, and record customer information.

6. The demand deposit account data processing system of claim 1, wherein said central computer system further includes database software adapted to automatically log and summarize transaction information from said at least one point of sale terminal, said transaction information including at least said demand deposit account information, said demand deposit account information including at least customer information, check sequence number, American Banking Association routing number, and checking account number; sale data, said sale data including at least one point of sale terminal location information, date, time, and sales amount information; transaction identification number; transaction status information; and settlement cutoff time.

7. The demand deposit account data processing system of claim 6, wherein said database software is further adapted to recognize and repair errors in said demand deposit account data and communicate said demand deposit account data to said data source at least once.

8. The demand deposit account data processing system of claim 6, wherein said database software is further adapted to communicate said demand deposit account data to said data source at least once until said transaction is settled on line.

9. The demand deposit account data processing system of claim 7, wherein said database software is further adapted to submit said demand deposit account data to said data source at least once until said transaction is settled on line.

10. The demand deposit account data processing system of claim 1, wherein said at least one point of sale terminal further includes a printer.

11. The demand deposit account data processing system of claim 1, wherein said at least one point of sale terminal further includes a keyboard.

12. The demand deposit account data processing system of claim 1, wherein said at least one point of sale terminal further includes a display monitor.

13. The demand deposit account data processing system of claim 1, wherein said at least one non-network bank database is one selected from the group consisting of an automated clearing house, a federal reserve bank, and wire transfer.

14. The demand deposit account data processing system of claim 1, wherein said database software is further to recognize and repair errors in said demand deposit account data and communicate said demand deposit account data to said data source at least once.

15. The demand deposit account data processing system of claim 1, wherein said database software is further adapted to communicate said demand deposit account data to said data source at least once until said transaction is settled on line.

16. A demand deposit account data processing system comprising:

demand deposit data having a data source, said data source being one selected from the group consisting of at least one network bank database and at least one non-network bank database;

at least one point of sale terminal adapted to receive said demand deposit account data to initiate a transaction;

a central computer system;

first communication means integrated with said at least one point of sale terminal for electronically communicating with said central computer system;

data storage means integrated with said point of sale terminal for storing said demand deposit account data;

second communication means integrated with said central computer system for receiving said demand deposit account data from said at least one point of sale terminal and communicating with said network bank database and said non-network bank database; whereby said central computer system identifies said data source and, in the case of demand deposit account data for said at least one network bank database, communicates with said at least one network bank database to verify said transaction on line, and in the case of demand deposit account data for said at least one non-network bank database, communicates with said at least one non-network bank database to verify said transaction off line.

17. A point of sale demand deposit account settlement process comprising the steps of:

(a) providing demand deposit account data having a data source, said data source being selected from the group consisting of at least one network bank database and at least one non-network bank database;

(b) providing sale data;

(c) providing a central computer system having first communication means for communicating with said data source:

(d) providing at least one point of sale terminal adapted to receive said demand deposit account data and said sale data and having data storage means for recording said demand deposit account data, said point of sale terminal further having a printer and second communication means for communicating with said first communication means;

(e) initiating a transaction by capturing said demand deposit account data and said sale data with said at least one point of sale terminal;

(f) storing said demand deposit account data in said data storage means;

(g) communicating said demand deposit account data and said sale data to said central computer system;

(h) identifying said data source for said demand deposit account data;

(i) communicating said demand deposit account data and said sale data to said data source;

(j) correlating said sale data and said demand deposit account data with said data source to obtain a transaction result; and (k) communicating said transaction result to said central computer system and said at least one point of sale terminal;

wherein step (j) further includes the substeps of:

(i) debiting on line a demand deposit account identified by said demand deposit account data if said demand deposit account has said at least one network bank database as its data source; and (ii) transferring funds through said at least one non-network bank database if said demand deposit account has said at least one non-network bank database as its data source, said at least one non-network bank database being selected from the group consisting of an automated clearing house, a federal reserve bank, and wire transfer.

18. The point of sale demand deposit account settlement process of claim 17, wherein said demand deposit account data includes magnetically readable data and non-magnetically readable data, said magnetically readable data identifying said data source and a demand deposit account; and wherein said communicating step includes communicating said magnetically readable data to said central computer system; and further wherein said identifying step includes mapping said data source from said magnetically readable data.

19. The point of sale demand deposit account settlement process of claim 18, wherein step (j) further comprises the substeps of:

(i) verifying a status of said demand deposit account; and (ii) comparing the status of said demand deposit account to said sale information to thereby obtain said transaction result.

20. The point of sale demand deposit account settlement process of claim 19, wherein step (j) further comprises the substeps of:

(iii) verifying said data source for said demand deposit account data;

(iv) generating a negative transaction result if said data source verification step fails;

(v) generating a negative transaction result if substep (ii) yields at least one transaction result selected from the group consisting of insufficient funds, uncollected funds, closed account, negative velocity/risk comparison; and (vi) generating a positive transaction result if substep (ii) yields at least one transaction result selected from the group consisting of sufficient funds, positive velocity/risk comparison, merchant override.

21. The point of sale demand deposit account settlement process of claim 20, wherein substep (vi) further includes the sub-substeps of:

(a) debiting said demand deposit account if said demand deposit account has said at least one network bank database as its data source; and (b) transferring funds through said at least one non-network bank database if said demand deposit account has said at least one non-network bank database as its data source, said at least one non-network bank database being selected from the group consisting of an automated clearing house, a federal reserve bank, and wire transfer.

22. The point of sale demand deposit account settlement process of claim 19, wherein step (j) further includes the substeps of:

(iii) voiding said transaction at said at least one point of sale terminal;

(iv) crediting said demand deposit account having said at least one network bank database as its data source in an amount equal to an amount debited in substep (i); and (v) issuing a credit to said demand deposit account having said at least one non-network bank database as its data source in an amount equal to an amount of said funds transferred in substep (ii).

23. The point of sale demand deposit account settlement process of claim 22, and further comprising the step of:

(l) printing said transaction result if said transaction was authorized by said data source, if said transaction was voided, if said demand deposit account was credited, or if said demand deposit account was issued a credit, said transaction result including at least an authorization number, said demand deposit account data, and said sale data, said sale data including at least point of sale terminal location information, date, time, and sales amount information.

24. The point of sale demand deposit account settlement process of claim 17, and further comprising the steps of:

(l) overriding said transaction result if said transaction result was negative; and (m) forcing a settlement of said transaction.

25. The point of sale demand deposit account settlement process of claim 24, and further comprising the step of:

(n) printing said transaction result if said transaction was authorized by said data source or if said transaction was overridden, said transaction result including at least an authorization number, said demand deposit account data, and said sale data, said sale data including at least point of sale terminal location information, data, time, and sales amount information.

26. The point of sale demand deposit account settlement process of claim 17, wherein said transaction may be voided at any step in said process.

27. The point of sale demand account settlement process of claim 17, and further comprising the step of:

(l) printing said transaction result if said transaction was authorized said data source, said transaction result including at least an authorization number, said demand deposit account data, and said data, said sale data including at least point of sale terminal location information, data, time, and sales amount information.

28. The point of sale demand deposit account settlement process of claim 17, wherein said central computer system further includes a plurality of databases, said plurality of databases including a financial institution conversion table database; and wherein step (h) further comprises the substeps of:

(i) mapping said demand deposit account data to a demand deposit account number posted through said data source, wherein said financial institution conversion table database is adapted to accomplish said mapping step; and (ii) verifying said transaction using authorization algorithms and said plurality of databases.

29. The point of sale demand deposit account settlement process of claim 28, wherein said plurality of databases further includes at least:

a positive database;

a negative database;

a velocity/risk database;

a closed account database; and an exception database.

30. The point of sale demand deposit account settlement process of claim 17, wherein said central computer system further includes a plurality of databases; and wherein said settlement process further comprises the step of:

(l) updating automatically said plurality of databases with information from said transaction result.

31. The point of sale demand deposit account settlement process of claim 17, wherein said transaction result is selected from the group consisting of at least a settled transaction result, an insufficient funds transaction result, and an erroneous demand deposit account data transaction result; and wherein said settlement process further comprises the step of:

(l) repairing said demand deposit account data and recommunicating said demand deposit account data and said sale data at least once to said data source for correlation if said erroneous demand deposit account data transaction result is communicated.

32. The point of sale demand deposit account settlement process of claim 17, wherein said transaction result is selected from the group consisting of at least a settled transaction result, an insufficient funds transaction result, and an erroneous demand deposit account data transaction result; and wherein said settlement process further comprises the step of:

(l) recommunicating said demand deposit account data and said sale data at least once to said data source for correlation if said insufficient funds transaction result is communicated.

33. The point of sale demand deposit account settlement process of claim 17, wherein said central computer system further includes a plurality of databases; and wherein said transaction result is selected from the group consisting of at least a settled transaction result, an insufficient funds transaction result, and an erroneous demand deposit account data transaction result; and wherein said settlement process further comprises the steps of:

(l) updating automatically said plurality of databases with information from said transaction result;

(m) repairing said demand deposit account data and recommunicating said demand deposit account data and said sale data at least once to said data source for correlation if said erroneous demand deposit account data transaction result is communicated; and (n) recommunicating said demand deposit account data and said sale data at least once to said data source for correlation if said insufficient funds transaction result is communicated.

\* \* \* \* \*